United States Patent [19]
Belliato et al.

[11] Patent Number: 5,979,209
[45] Date of Patent: Nov. 9, 1999

[54] METHOD OF FORMING A TORSION BAR WITH HEXAGONAL HEADS

[75] Inventors: Yannick Belliato, Bouxiere Aux Dames; Jean-Dominique Voisin, Nancy; Frédéric Vuillemard, Liverdun, all of France

[73] Assignee: Allevard Ressorts Automobile, France

[21] Appl. No.: 09/128,233

[22] Filed: Aug. 3, 1998

[51] Int. Cl.[6] .................................................. B21D 53/88
[52] U.S. Cl. ...................... 72/340; 72/342.5; 72/342.96; 72/377; 29/897.2; 267/154
[58] Field of Search .......................... 72/377, 340, 342.5, 72/342.6, 342.96; 219/150 R, 151, 152; 29/897.2; 267/154

[56] References Cited

U.S. PATENT DOCUMENTS

| | | |
|---|---|---|
| 2,667,558 | 1/1954 | Aeckersberg . |
| 2,726,307 | 12/1955 | Weaving . |
| 2,836,706 | 5/1958 | Cavanagh . |
| 2,890,325 | 6/1959 | Havlik . |
| 2,953,674 | 9/1960 | Grodt . |
| 4,231,555 | 11/1980 | Saito ........................................ 267/154 |
| 5,520,376 | 5/1996 | Langa et al. ............................ 267/154 |

OTHER PUBLICATIONS

Boyer, Howard E., "Atlas of Fatigue Curbs" ISBN: 0–87170–214–2, American Society for Metals, p. 490, 1978.

Primary Examiner—Daniel C. Crane
Attorney, Agent, or Firm—Rudnick & Wolfe

[57] ABSTRACT

To make a metal torsion bar having an elongate central body connected to two hexagonal end heads via shoulders, the ends of a torsion bar blank are initially upset while hot so as to form the shoulders of the torsion bar together with cylindrical head blanks, after which each head blank is machined by removing material until the corresponding hexagonal head has been obtained.

6 Claims, 1 Drawing Sheet

METHOD OF FORMING A TORSION BAR WITH HEXAGONAL HEADS

FIELD OF THE INVENTION

The present invention relates to methods of forming torsion bars with hexagonal heads.

More particularly, the invention relates to a method of forming a metal torsion bar having a relatively narrow elongate central body extending between two larger ends, each end having a head of hexagonal section and a shoulder connecting the hexagonal head to the central body by tapering towards the body.

BACKGROUND OF THE INVENTION

An example of a torsion bar having hexagonal heads is disclosed in document U.S. Pat. No. 4,231,555.

The ends of torsion bars of that type are generally formed in a single step by forging in a die which imparts their outside shapes to the hexagonal heads and to the shoulders, which die is constituted by a plurality of moving parts to enable the torsion bar to be removed after the hexagonal heads have been formed.

That method of making hexagonal heads can achieve only low dimensional precision for the heads.

In particular:

forging flash is generally present on the hexagonal heads and the shoulders in the join planes between the various moving parts of the die used for forging said heads;

even ignoring the flash, the dimensions of the various portions of the hexagonal heads are not very precise; and the angular orientation of the hexagonal heads relative to each other about the central axis of the torsion bar is likewise not very precise.

Because of this poor dimensional precision, it can sometimes be difficult to incorporate torsion bars in the mechanical assemblies of which they are to form a part.

In particular, when torsion bars are to be fitted to vehicle suspensions, the poor precision concerning the relative orientation of the hexagonal heads makes it complicated and sometimes even impossible to perform initial adjustment of the various suspensions of any given vehicle so as to guarantee that the rest position of the vehicle is accurately horizontal. Said relative orientation of the hexagonal heads contributes to determining the rest height of the vehicle over each wheel.

In addition, forming the ends of the torsion bar by forging gives rise to structural defects (in particular concerning fiber orientation) that reduce the mechanical performance of the torsion bar in terms of the stresses that can be accepted, and that also reduce its lifetime.

To obtain satisfactory mechanical performance, it is therefore generally necessary to make torsion bars having hexagonal heads out of materials that are expensive, such as chromium steels or micro-alloyed steels.

OBJECTS AND BRIEF SUMMARY OF THE INVENTION

A particular object of the present invention is to mitigate those drawbacks.

To this end, according to the invention, the method of forming torsion bars with hexagonal heads comprises the steps consisting in:

taking a torsion bar blank which includes said central body extending between said two ends;

at each end of the torsion bar blank, forming the above-mentioned shoulder corresponding to said end together with a head blank by axially upsetting said end of the torsion bar blank while it is hot towards the central body in a hollow cylindrical die, said die not coming into contact with the shoulder and giving the head blank a cylindrical shape which contains more material than the hexagonal head that is to be formed; and machining each head blank by removing material until the corresponding hexagonal head has been obtained.

By means of these dispositions, shoulders are obtained that are accurately shaped and practically free from internal defects, which is essential insofar as the shoulder zone is the seat of very large mechanical stresses when the torsion bar is in operation.

This gives the torsion bar excellent mechanical performance in terms of the stresses that can be accepted and long lifetime due to excellent fatigue strength.

Similarly, the hexagonal heads proper are themselves practically free from internal defects, thus also contributing to increasing the mechanical performance and the lifetime of the torsion bar.

As a result, it is possible to make the torsion bar with hexagonal heads of the invention using a material that is of relatively low cost, for example a carbon steel in particular of the XC type (French standard NF A 02-005) or of the 10xy type (SAE numbering system for wrought or rolled steel, SAE J 402, November 1993).

In addition, because the final shape of the hexagonal heads is obtained by machining to remove material, the final shape is very precise, as is the relative orientation of the hexagonal heads relative to each other. This makes it possible to obtain precision that has never before been achieved concerning the shape and the relative orientation of the hexagonal heads of the final torsion bar, even after heat treatment (in particular surface quenching).

This greatly facilitates incorporating torsion bars in the mechanical assemblies for which they are designed. In particular, when the torsion bars are to be fitted to motor vehicle suspensions, the high precision of the relative orientation of the hexagonal heads greatly facilitates initial adjustment of the various suspension units in a single vehicle, for the purpose of guaranteeing that the rest position of the vehicle is perfectly horizontal.

In preferred embodiments of the invention, use may optionally be made of one or more of the following dispositions:

during the upsetting of each end of the torsion bar blank, said end of the blank is heated by passing an electric current therethrough;

the die is in the form of a single piece;

the machining of the head blank by removing material is performed by milling;

the hot upsetting of each end of the torsion bar blank is performed in a circularly cylindrical die giving the corresponding head blank a shape that is likewise circularly cylindrical;

the torsion bar is a suspension torsion bar for a vehicle;

the torsion bar is made of a carbon steel belonging to the 10xy category of the SAE J402 standard where x and y are two integers lying in the range 0 to 9; and the method also includes a step of surface quenching by induction.

BRIEF DESCRIPTION OF THE DRAWING

Other characteristics and advantages of the invention appear from the following description of an embodiment given by way of non-limiting example and with reference to the accompanying drawing.

In the drawing.

MORE DETAILED DESCRIPTION

In the various figures, the same references are used to designate elements that are identical or similar.

Figure 1:
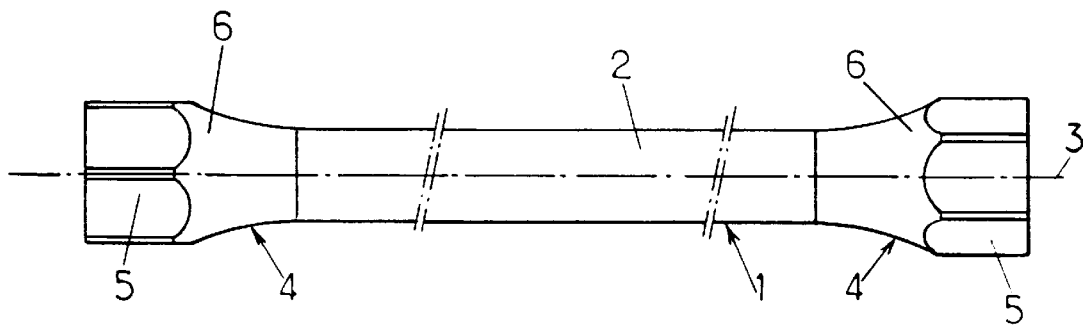
FIG. 1 is a side view of a torsion bar having hexagonal heads that can be made by the method of the invention.
Figure 2:
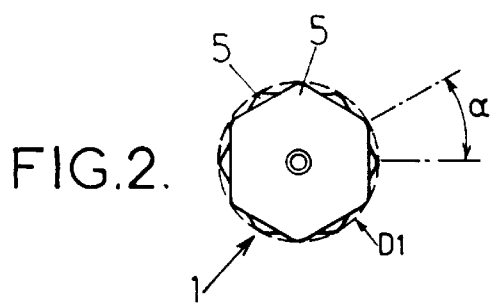
FIG. 2 is an end view of the FIG. 1 torsion bar.

As shown in FIGS. 1 and 2, the method of the invention makes it possible to provide a metal torsion bar 1 having a central body 2 which extends longitudinally along an axis 3.

The central body 2 extends between two larger ends 4, each comprising:

- a head 5 of hexagonal section, inscribed in a circle of diameter D1; and
- a shoulder 6 connecting the hexagonal head 5 to the central body 2, by tapering towards the body.

The relative angular position of the hexagonal heads 5 is defined in advance: at rest, the two hexagonal heads 5 may either be disposed mutually in angular correspondence, or else they may have a non-zero angle α between them, which angle is equal to 30° in the example shown.

Figure 3:
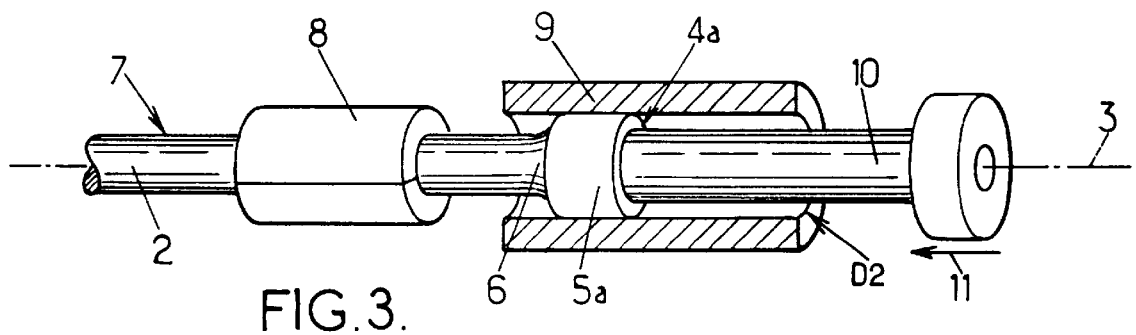
FIG. 3 is a diagrammatic perspective view showing the hot upsetting step of the method of the invention.

According to the invention, to make the torsion bar 1, a torsion bar blank 7 is used (see FIG. 3) which is cylindrical in shape, and preferably circularly cylindrical about the central axis 3. This torsion bar blank includes the body 2 of the torsion bar and extends longitudinally between two ends 4a.

The torsion bar blank is preferably made of carbon steel belonging to the XC category of French standard NF-A-02-005 (and in particular XC 42), which corresponds to the 10xy category (in particular 1042) of the November 1993 SAE J402 standard (SAE numbering system for wrought or rolled steel).

The torsion bar blank 7 is initially subjected to a hot upsetting operation at its ends 4a, thereby enabling circularly cylindrical head blanks 5a to be formed at said ends 4a, together with the finished shoulders 6.

During this operation:

the torsion bar blank body 2 is held by a metal jaw each end 4a of the torsion bar blank is placed in a one-piece hollow die 9 which is circularly cylindrical in shape, being centered on the axis 3, and which has an inside diameter D2 equal to or slightly greater than the above-mentioned diameter D1;

a metal anvil 10 is pressed axially against said end 4a of the torsion bar blank in the direction of arrow 11; and an electrical potential difference is generated between the jaw 8 and the anvil 10 so as to pass an electric current through said end 4a of the torsion bar blank.

Under the effect of the passage of the electric current, the end 4a of the torsion bar blank heats up and becomes malleable, so that said end is upset in the direction of arrow 11 by the anvil 10, thereby simultaneously thickening said end 4a until the corresponding head blank 5a has been formed with the outside diameter D2.

During this operation, the final shoulder 6 at the corresponding end of the torsion bar is formed by the operation of upsetting the end 4a of the torsion bar blank, without the shoulder 6 coming into contact with the die 9.

The head blank 5a is then machined by removing material, in particular by milling, and then the torsion bar is subjected to one or more additional treatments, in particular to surface quenching by induction.

The torsion bar 1 obtained in this way presents high dimensional precision, since the tolerances obtained on the dimensions of the hexagonal heads are ±0.125 mm and the tolerances obtained for the above-mentioned α are ±1.5°.

In addition, the torsion bar 1 can also accept a high level of stress (about 1300 MPa, compared with about 850 MPa for conventional torsion bars having hexagonal heads) and has high fatigue strength (lifetimes of about 1 million torsion cycles are obtained during validation testing of parts, compared with 134,000 cycles on average for prior art torsion bars having hexagonal heads).

We claim:

1. A method of forming a vehicle suspension metal torsion bar having a relatively narrow elongate central body extending between two larger ends, each end having a head of hexagonal section and a shoulder connecting the hexagonal head to the central body by tapering towards the body, the method comprising the steps of:

taking a torsion bar blank which includes a central body blank extending between two end blanks, said torsion bar blank being made of carbon steel belonging to the 10xy category of the SAE J402 standard where x and y are two integers lying in the range 0 to 9;

at each end blank, forming one of said shoulders together with a head blank by axially upsetting said end blank while it is hot towards the central body blank in a hollow cylindrical die, said die not coming into contact with the shoulder and giving the head blank a cylindrical shape which contains more material than the hexagonal head that is to be formed; and machining each head blank by removing material through metal cutting until the corresponding hexagonal head has been obtained.

2. A method according to claim 1, in which, during the upsetting of each end of the torsion bar blank, said end of the blank is heated by passing an electric current therethrough.

3. A method according to claim 1, in which the die is in the form of a single piece.

4. A method according to claim 1, in which the machining of the head blank by removing material is performed by milling.

5. A method according to claim 1, in which the hot upsetting of each end of the torsion bar blank is performed in a circularly cylindrical die giving the corresponding head blank a shape that is likewise circularly cylindrical.

6. A method according to claim 1, further including a step of surface quenching by induction.

* * * * *